United States Patent
Schäling et al.

(10) Patent No.: US 10,918,236 B2
(45) Date of Patent: Feb. 16, 2021

(54) CAPSULE FOR PRODUCING A LIQUID FOOD ITEM, METHOD FOR MANUFACTURING A CAPSULE FOR PRODUCING A LIQUID FOOD ITEM, USE OF A CAPSULE FOR PRODUCING A LIQUID FOOD ITEM, SYSTEM MADE UP OF A CAPSULE AND A DEVICE, AND DEVICE FOR THE PRODUCTION OF A LIQUID FOOD ITEM

(71) Applicant: LigaLife GmbH & Co. KG, Frankfurt (DE)

(72) Inventors: Burkhard Schäling, Obertaufkirchen (DE); Stefan Schönenberger, Hinwil (CH); Dominic Zwicker, Nesslau (CH); Cyrill Baur, Schwerzenbach (CH)

(73) Assignee: LigaLife GmbH & Co. KG, Frankfurt (DE)

( * ) Notice: Subject to any disclaimer, the term of this patent is extended or adjusted under 35 U.S.C. 154(b) by 182 days.

(21) Appl. No.: 15/756,507

(22) PCT Filed: Aug. 31, 2016

(86) PCT No.: PCT/EP2016/001468
§ 371 (c)(1),
(2) Date: Feb. 28, 2018

(87) PCT Pub. No.: WO2017/036595
PCT Pub. Date: Mar. 9, 2017

(65) Prior Publication Data
US 2018/0242776 A1     Aug. 30, 2018

(30) Foreign Application Priority Data
Sep. 1, 2015 (DE) .................. 10 2015 011 170.1

(51) Int. Cl.
*A47J 31/36* (2006.01)
*A47J 31/40* (2006.01)
(Continued)

(52) U.S. Cl.
CPC ........... *A47J 31/3628* (2013.01); *A47J 31/40* (2013.01); *B65B 29/022* (2017.08); *B65D 85/8043* (2013.01)

(58) Field of Classification Search
CPC ..... A47J 31/3628; A47J 31/40; B65B 29/022; B65D 85/8043; D06F 58/263;
(Continued)

(56) References Cited

U.S. PATENT DOCUMENTS 9,359,126 B2 * 6/2016 Wong ................ A47J 31/0673
2002/0078831 A1 6/2002 Cai
(Continued)

FOREIGN PATENT DOCUMENTS

DE  602004007883 T2   4/2008
DE  102007041093 A1   3/2009
(Continued)

OTHER PUBLICATIONS

WO 2015049270; Bugnard et al.; Capsule and System for Preparing Liquid Food; EPO English Machine Translation; Dec. 19, 2019; pp. 1-7.*
(Continued)

*Primary Examiner* — Bayan Salone
(74) *Attorney, Agent, or Firm* — Howard IP Law Group, PC

(57) ABSTRACT

A capsule for producing a liquid food item includes a capsule body and two chambers for holding two substances. One chamber contains a perforation element for perforation
(Continued)

of the capsule body. An anvil for a punch of a device into which the capsule can be inserted is provided on the perforation element.

14 Claims, 9 Drawing Sheets

(51) Int. Cl.
  *B65D 85/80* (2006.01)
  *B65B 29/02* (2006.01)
  *B65D 85/804* (2006.01)
(58) Field of Classification Search
  CPC .. D06F 58/20; D06F 58/28; D06F 2058/2858; D06F 2058/289
  See application file for complete search history.

(56) References Cited

U.S. PATENT DOCUMENTS

| | | |
|---|---|---|
| 2005/0266122 A1 | 12/2005 | Franceschi |
| 2009/0126578 A1 | 5/2009 | Amann et al. |
| 2009/0159525 A1 | 6/2009 | Rosa |
| 2011/0142996 A1 | 6/2011 | Kruger |
| 2012/0060697 A1 | 3/2012 | Ozanne |
| 2012/0251668 A1 * | 10/2012 | Wong .................. A47J 31/0673 426/77 |
| 2014/0020565 A1 | 1/2014 | Nabeiro |
| 2014/0272016 A1 | 9/2014 | Nowak |
| 2014/0308406 A1 | 10/2014 | O'Brien |

FOREIGN PATENT DOCUMENTS

| | | |
|---|---|---|
| DE | 602005004554 T2 | 10/2011 |
| EP | 1101430 A1 | 5/2001 |
| EP | 1580144 A1 | 9/2005 |
| EP | 1710172 A1 | 10/2006 |
| EP | 1594763 B1 | 5/2008 |
| EP | 2332855 A1 | 6/2011 |
| EP | 2537779 A1 | 12/2012 |
| GB | 1256247 | 12/1971 |
| GB | 1256247 A | 12/1971 |
| WO | 03082065 A1 | 10/2003 |
| WO | 2007054479 A1 | 5/2007 |
| WO | 2011080022 A1 | 7/2011 |
| WO | 2011138405 A1 | 11/2011 |
| WO | WO-2011138405 A1 * | 11/2011 .......... A47J 31/3695 |
| WO | 2015049269 A1 | 4/2015 |
| WO | 2015049270 A1 | 4/2015 |
| WO | WO-2015049270 A1 * | 4/2015 |

OTHER PUBLICATIONS

WO 20111138405; Schoedler et al.; Container and Device Comprising such a Container; EPO English Machine Translation; Dec. 20, 2019; pp. 1-12.*
International Search Report dated Mar. 14, 2016 for related PCT Application No. PCT/EP2016/001468.

* cited by examiner

CAPSULE FOR PRODUCING A LIQUID FOOD ITEM, METHOD FOR MANUFACTURING A CAPSULE FOR PRODUCING A LIQUID FOOD ITEM, USE OF A CAPSULE FOR PRODUCING A LIQUID FOOD ITEM, SYSTEM MADE UP OF A CAPSULE AND A DEVICE, AND DEVICE FOR THE PRODUCTION OF A LIQUID FOOD ITEM

CROSS-REFERENCE TO RELATED APPLICATIONS

This application is a national phase application under 35 U.S.C. § 371 of International Patent Application No. PCT/EP2016/001468 filed Aug. 31, 2016, which claims priority to German Application No. 10 2015 011 170.1 filed Sep. 1, 2015, the entire contents of all of which are incorporated herein by reference for all purposes.

FIELD OF THE INVENTION

The invention relates to a capsule for producing a liquid food item, a method for manufacturing such a capsule, use of a capsule for producing a liquid food item and a system comprised of a device and a capsule.

BACKGROUND

Capsules for producing a liquid food item, in particular coffee, are known. The capsule has a chamber for accommodating a substance, in particular coffee. A liquid can be introduced into the chamber of the capsule, so that the desired liquid food item, in particular coffee, is formed from the substance and the liquid introduced into it by means of a corresponding device, such as a coffee maker.

EP 1 710 172 A1 discloses a disposable capsule with an inlet closure as well as an outlet closure that are opened by the hydraulic action of a liquid. To do so, the liquid is supplied from an infusion module under a predetermined pressure, but no additional means are required for puncturing the disposable capsule.

The embodiment with regard to a capsule having two chambers is complicated and leads to an unsatisfactory result in the sense of a defined and predetermined mixture of two substances present in two different chambers of the capsule.

SUMMARY

The object of the present invention is to create a capsule for producing a liquid food item, a method for manufacturing a capsule, a use of a capsule and a system comprised of a capsule and a device, in which the discharge of the liquid out of the capsule can take place largely in a defined manner. At least one of the disadvantages can be overcome: contamination of the device into which the capsule is inserted with the capsule contents and/or the resulting liquid, inadequate rinsing out and/or mixing of the substances present in the capsule; risk of injury, in particular when cleaning the device, on pointed elements inside the device; lack of coordination of the element for carrying out the perforation with the capsule; as well as undefined discharge from the capsule and/or discharge that cannot be definitely limited.

This object is achieved through the subject matters disclosed herein. Advantageous specific embodiments are also disclosed in the description which follows.

In one aspect, the invention is based on the fundamental idea that a capsule can be manufactured, in which a perforation element for perforating the capsule body is arranged inside the capsule. According to this aspect of the invention, the capsule thus includes a perforation element, with which the capsule body can be perforated, in particular in an essentially defined perforation site. To carry out the perforation, an anvil arranged on the perforation element can cooperate with the ram on a machine into which the capsule can be inserted. To produce the liquid food item, the machine applies a pressure to the anvil by means of a ram, so that the perforation element, which is then operatively connected to the anvil, perforates the capsule body. The machine into which the capsule is inserted need not have a perforation element itself, which can perforate the capsule body of the capsule. This eliminates contamination of a perforation element formed on the machine. Furthermore, perforation elements, which are adapted to the capsule and can be inserted into the capsule already during the manufacture of same, may be used. Adaptation of the perforation of the capsule can thus be carried out within the elements and the geometry present in the capsule. Since the capsule according to the invention requires only interaction with a ram provided on the machine, a change in the geometry and/or structure of the capsule can be taken into account by adapting the perforation element provided inside the capsule. This design of the capsule is desirable not only with regard to perforation of the capsule, but it also permits easy handling in filling and then placement and connection to a divider separating the two chambers and a cover as well as simple use in a device for producing liquid food items. The perforation element may remain in the capsule after use and then be discarded.

The term "capsule" is understood according to the invention to refer to a small container that is preferably symmetrical in one axis and is closed in particular, essentially being ellipsoidal, spherical, cylindrical or conical in at least some sections. The capsule may be designed to be cup-shaped or bowl-shaped. The capsule may be closed with a cover on the end and/or at the head. A divider may be present in the capsule to form the subdivision for two chambers. The cover and the divider may be arranged essentially at a right angle or at a small angle to the axis of symmetry of the capsule. The volumetric capacity of the capsule may be between approx. 30 mL and approx. 200 mL in particular, preferably between approx. 50 mL and approx. 150 mL, in particular preferably between approx. 60 mL and approx. 120 mL.

The term "capsule body" according to the invention comprises the capsule shell and/or the capsule cup, which may be closed with a cover. The term "capsule body" thus comprises according to the invention the side wall and the body of the capsule. The capsule body may define the outside contour of the capsule in the area of side wall and the bottom. The capsule body may be closed with the cover at a flange formed on the capsule body, with the closure being achieved by means of sealing and/or thermosealing, ultrasonic welding or adhesive bonding, in particular by a method that produces a physically bonded connection between the cover and the flange. The term "flange" is understood according to the invention to refer to a section that protrudes with respect to a surface and is provided in particular on the head of the container and may form a peripheral section of the container and/or the capsule. The cover sits on the flange at the edge and may be embodied as a foil or film. The capsule body may comprise and/or consist of a polymer in particular. The capsule body may comprise multiple layers. For example, it is possible for the capsule body to comprise a stratification of PP/EVOH/PP (polypropylene/ethylene vinyl alcohol/polypropylene). The capsule body may also comprise and/or be made of a biodegradable material. The capsule body may comprise and/or be made of a thermosetting plastic produced from PLA. The capsule body may also comprise a polypropylene coated with a plasma ($SiO_x$). The materials allow simple injection molding, extrusion, blow molding, heat forming, welding, deep drawing and machining. Furthermore, the materials are physiologically safe and are suitable in particular for applications in the area of foods and pharmaceuticals.

The term "comprise(s)" in the sense of this invention is to be understood broadly and includes both the term "consist(s) of," which does not exclude the usual contaminants, as well as the presence of other materials.

The term "divider" is understood to refer to a structural element of the capsule which is present for dividing the two chambers in the capsule and/or the container. The divider may be embodied in particular as a foil or film, wherein the term "foil" or "film," as used according to the invention, includes a thin, flat element, which may preferably be embodied as a thin metal, paper or plastic element, which may be embodied as a very thin piece. The divider may preferably comprise or be designed as a barrier, which may be impermeable for a fluid, in particular a liquid. The divider may form the bottom for one chamber and the cover for the other chamber, so that two functions are served with one element. The divider and/or the connection of the divider to a shoulder on the capsule body is/are preferably designed, so that the separation function of the divider is eliminated when the liquid food item is being produced, and a fluid is flowing at least partially through the two chambers of the capsule, and the substances are being mixed with the fluid to form the liquid food item. In particular the cover and the divider may be punctured with an element resembling an injection needle, wherein a lateral hole may be formed in the element at the level of the upper chamber so that a fluid under pressure into the element may be rinsed into the upper chamber and may go from there by means of the hole at the side into the second chamber. The upper chamber is thus rinsed out and the fluid with the substance from the upper chamber goes into the lower chamber through the element resembling an injection needle (after it enters into the hole at the side and further in the longitudinal course of the element). It is thus possible to create an embodiment in which the fluid does not flow through perforations in the divider but instead flows form one chamber into the other chamber within the element resembling an injection needle. The fluid with the two substances from the two chambers exits from the capsule at the outlet created by the perforation element.

The divider is preferably connected to a shoulder formed on the capsule body. The term "shoulder" according to the invention comprises an intermediate section of the capsule body, which is formed at an angle to an internal wall section of the container and/or the capsule and extends into the interior of the container and/or capsule. The shoulder may form a section of a platform. A wall of the capsule in the area of the shoulder and in the areas connected thereto preferably has essentially the same thickness so that the outside contour of the capsule corresponds to the inside contour of the capsule at least in the aforementioned regions. The shoulder may also be formed at an angle to a wall section of the capsule on the outside. The shoulder can interrupt the otherwise uniform course of the outside contour of a wall of the capsule. The divider is placed on the shoulder at the edge and is bonded to it, for example, by means of thermosealing, ultrasonic welding or adhesive bonding, preferably in a physically bonded manner.

As an umbrella term, the term "food item" used according to the invention includes both a liquid, such as drinking water, and any solid, pasty or fluidic nutrients and nutritional supplements. The substances in the chambers may be micronutrients, macronutrients, diet foods, high-calorie nutritional supplements, balanceable nutritional supplements, fruit juice (concentrates), vegetable juice (concentrates), powdered fruit, fruit extracts, puree concentrates, pulp concentrates and/or mixtures thereof. The substances may be in the form of a liquid, nectar-like, syrupy, honey-like, solid or semi-solid substance or in the form of a powder, granules or soluble or effervescent tablets, which release a gas. Powdered substances may be freeze-dried substances. The substances in the chambers may have the same consistency or a different consistency. For example, a powdery substance may be present in one chamber and a syrupy substance may be present in the other chamber or there may be powdered substances in each chamber.

Micronutrients, which may be water-soluble and fat-soluble, include vitamins, minerals, trace elements and secondary plant substances. Macronutrients include proteins, fats and carbohydrates.

The substances present in the chambers can preferably be separated in such a way that a longer storage time is possible in comparison with a mixture of substances. The substances may be mixed and/or combined shortly before preparation and use and/or oral ingestion of the food.

The term "perforation element" denotes an element, with which it is possible to punch a hole and/or create an outlet in the capsule body. A hole may be formed in particular at an essentially predetermined perforation site on the capsule body using the perforation element so that then the substances in the two chambers may leave the capsule. The perforation elements can be discarded together with the capsule. The perforation element is preferably movable in the capsule. The perforation element may be arranged in the chamber together with the surrounding substance. The term "surround" in this context comprises the arrangement of substance and at least one portion of the perforation element, based on the same height of the capsule in the direction of a central axis of the capsule. The perforation element may be designed to be elongated in particular, wherein the ratio between the longitudinal extent and the cross section (transverse extent) across the longitudinal extent is greater than 1.5, preferably greater than 2, more preferably greater than 2.5 and in particular preferably greater than 3. The perforation element has a perforation tip on at least one end face. The perforation tip may be formed by a cross section of the perforation element, which tapers to a point. The perforation tip may comprise surface regions forming an angle of less than 90° to the longitudinal axis of the perforation element. The perforation tip may have an end face tapering to a point on an end face of the perforation element, i.e., ideally tapering to a point. The perforation tip may taper toward at least one end face of the perforation element. The perforation element may comprise a polymer or a polypropylene in particular. The perforation element may also comprise and/or consist of polyamide [nylon] fibers or a high-performance polymer or a polyphthalamide. For example, materials available under the brand names "Grivory" or "Grilon" may also be used, as well as PA 6.6.

The perforation element may be arranged in a chamber of the capsule without having a physically bonded connection to the capsule body, the cover or the divider. The perforation element may thus be arranged freely, i.e., loosely in the chamber, wherein the perforation element may be held in the chamber. The capsule manufacturing process can be simplified in this way, in that the perforation element can be inserted into the chamber only as a separate component.

The perforation site in the capsule body may be embodied as an intended breaking point, which breaks under the influence of the perforation element. The perforation site may be embodied as a structure present in the capsule body. The perforation site may be embodied as a local protrusion or a local depression in the capsule body. Either protrusion or depression may be embodied three-dimensionally in particular. The perforation site may be arranged centrally in the capsule body in particular. There may be a reduction in the material of the capsule body at the perforation site.

The perforation element is preferably arranged in the lower one of the two chambers of the capsule, wherein in the case of a capsule, with its cross section tapering toward an end, the chamber that is closer to the tapered end is the lower chamber. A section of the perforation element near the anvil, in particular on the other end face, may be a distance away from the tip of the perforation of the perforation element. The perforation element may thus preferably have a perforation tip at one end and the anvil section at the other end, wherein one cannot rule out the possibility that the anvil section itself is embodied as a (perforation) tip. The perforation element is preferably embodied in the form of an elongated element. The diameter of the perforation element in the longitudinal direction is in the range of approx. 3 mm to approx. 18 mm, preferably approx. 5 mm to approx. 15 mm, especially preferably approx. 5 mm to approx. 10 mm. In a preferred embodiment the diameter of the perforation element amounts to approx. 8 mm. The length of the perforation element is in the range of approx. 15 mm to approx. 35 mm, preferably approx. 20 mm to approx. 30 mm, especially preferably approx. 23 mm to approx. 28 mm. In a preferred embodiment, the length of the perforation element is approx. 25 mm. In particular the perforation element may be embodied as a mandrel-shaped element. The perforation element is preferably arranged essentially centrally to the central axis of the capsule.

The term "anvil" according to the invention comprises an element that is in direct or indirect contact with the perforation element and can come in direct or indirect contact with a ram on the device end. The anvil may be designed in one piece with the perforation element. The anvil may be provided separately from the perforation element and may surround the anvil section of the perforation element. The anvil section and the anvil, which is embodied separately from the perforation element, may be joined together in a form-fitting, force-locking and/or physically bonded manner. A one-piece embodiment of the perforation element with an anvil has the advantage of reducing the number of elements required to manufacture the capsule. A multi-piece embodiment, in which the perforation element and the anvil are manufactured separately from one another, has the advantage that an adaptation of the perforation element to the ram on the device end is possible by means of this embodiment of the anvil without having to alter the perforation element, which is aligned with the embodiment of the capsule and/or the capsule body. An anvil according to the invention may also be embodied as an element that tapers to a tip, in particular as an additional (perforation) tip arranged on the end.

The capsule according to the invention has two chambers, such that a syrup may be present in one chamber and a powder may be present in the other chamber. The capsule can be flooded with cold water, and the first chamber, for example, the chamber filled with powder, and the second chamber, which may contain a syrup, for example, and can dissolve the contents of the first chamber and the second chamber, which may contain a syrup, for example, and then pass through the outlet out of the capsule into the container that is provided to receive the liquid food item thereby prepared. Due to the complete flooding, the contents of the capsules can be "washed out" completely, so that only an empty, cleaned capsule remains, which can be discarded with no problem, in particular in the plastic waste and/or residual waste. It is also possible to provide for the plastic to be recycled.

The perforation element is preferably arranged on the bottom in the chamber of the capsule. The length of the perforation element and the anvil may be designed so that, when the perforation element is arranged in the chamber together with the anvil arranged on the anvil section, the anvil at the end—at a distance from the perforation tip —is in contact with the divider separating the two chambers. The divider may stabilize the perforation element directly or indirectly by means of the anvil on at least one end. The length of the perforation element together with the anvil may correspond essentially to the height of the lower chamber.

The perforation element is preferably carried by a guide sleeve arranged inside the chamber, in particular in the direction of the perforation site, so that a defined perforation can be created at a predetermined location, in particular the perforation site. The term "guide sleeve" comprises a guide, which is embodied in at least some sections as an annular or tubular element, wherein the guide may be formed essentially by a tubular material optionally having perforations or slots. The tubular material may also be formed by means of journals or protrusions, which define the inside contour, which may surround the perforation element. The inside contour need not have a closed circumference. The guide sleeve may be aligned, so that the perforation element can perforate essentially exactly one location in the capsule body. The guide sleeve is preferably connected to the capsule body at the bottom of the capsule. In particular, the capsule therefore has a flattened area on the bottom in which the guide sleeve is connected to the capsule body. The guide sleeve may be made of or comprise polypropylene, a partially crystalline thermosetting plastic. It is also possible for the guide sleeve to be designed in one piece with the capsule body. The capsule body can be manufactured together with the guide sleeve in an injection molding process. It is also possible to provide that the guide sleeve is manufactured separately and is connected to the capsule body by means of ultrasonic welding. A flange-type base area, which can be connected to the bottom of the capsule body, may therefore be formed on the guide sleeve for this purpose. The sleeve and the flange-type base area may form an angle of essentially 90° to one another. Ultrasonic welding can be carried out by means of a sonotrode, in which high-frequency mechanical vibrations are introduced into the guide sleeve, in particular to the flange-shaped base area and/or the bottom of the capsule body. The guide sleeve may define an essentially straight-line direction of movement for the perforation element. For example, the sleeve may extend from the capsule body into the interior of the chamber and may accommodate the perforation element in such a way that the sleeve surrounds the perforation element peripherally, at least over a longitudinal section arranged at the end in particular.

The capsule body is designed in particular to form a perforation site in the passage of the guide sleeve, such that the capsule body has a section in the passage that is bent away from the chamber or bent into the chamber. A section that may be advantageous for a defined outlet can be created in the capsule body in this way. In particular a nose-shaped section of the capsule body protruding into the interior of the capsule may be formed in the passage of the guide sleeve. The perforation tip of the perforation element may be directed at the nose, and when the capsule body is perforated in the area of the nose, a shaped and punctured outlet may be created.

The guide sleeve preferably has slots at the side, through which the liquid food item formed with the substances in the capsule can escape from the capsule. The slots may be used as the outlet passage for the liquid food item and result in the least possible residual substance remaining in the capsule from the liquid food item prepared there. The slots may be formed in the longitudinal direction of the sleeve or in a curve to the longitudinal direction of the sleeve. A curved embodiment in deviation from the straight-line embodiment parallel to the longitudinal extent of the guide sleeve may result in an improvement in the outlet of the food item because a larger circumferential area around the guide sleeve may be covered.

In one embodiment, guide elements extending in the longitudinal direction of the guide sleeve may be formed in the guide sleeve and may cooperate with corresponding elements (guided) that are formed on the perforation element. The guidance of the perforation element can be enhanced by means of the guide elements formed on the guide sleeve. For example, protrusions protruding into the guide sleeve may cooperate with protrusions on the perforation element and improve the alignment and/or guidance of the perforation element in the guide sleeve. For example, a rail-type or cam-shaped embodiment of guide elements in the guide sleeve may be possible. By means of a cam-shaped guide or a rail-shaped guide, an elongated element which is provided on the perforation element and extends at least partially in the longitudinal direction of the perforation element, may be guided along the cam-type and/or rail-type guide elements.

In a preferred embodiment, the perforation element has a longitudinal section, which may be designed with a star-shaped cross section. The cross section may be an n-angular polygon, in particular a 2n-angular shape, whose edges may all be the same length. The perforation effect can be enhanced with sharp edges. A symmetrical design, in particular a design having point symmetry with the midpoint of the cross section, is preferred in order to achieve a uniform perforation effect based on the periphery. An n-angular star may be reduced to straight-line segments connecting one corner of a polygon to the midpoint of the polygon and/or cross section. The cross section may also be embodied as a cruciform or stellate form. For guidance by means of the guide elements possibly provided in the guide sleeve, straight-line segments extending in the longitudinal direction may be formed by the corners of the cross section and may also be guided. By means of an at least partially cruciform embodiment of the perforation element, it is possible to reduce the weight and material of the perforation element based on an envelope around the periphery.

In one preferred embodiment, the capsule has a press element, which is arranged on the divider in the acting direction of the perforation element. By means of the press element, lengthening of the perforation element into the other chamber of the capsule can be achieved without needing to extend the actual perforation element and/or the press element through the divider. The perforation element, which is present in one chamber, can cooperate with the press element under the action of the ram on the device end, such that there is a flow of force between the ram on the device end, the press element and the perforation element. The press element in particular is situated with an acting element in the direction of the active connection of the ram on the device end and the perforation element. The press element preferably has a height corresponding essentially to the height of the chamber in which the press element is arranged. The press element can bridge the distance in the height of the upper chamber to form the flow of force between the ram on the device end and the perforation element. The press element is preferably arranged in the upper chamber. The press element may sit on the divider, in particular sitting freely, i.e., without a physically bonded connection. In a preferred embodiment, the press element is arranged centrally in the capsule and is aligned centrally with the perforation element. Providing a press element can reduce the distance to be traveled by the ram on the device end for acting on the perforation element.

In a preferred embodiment, the press element has an aligning element, in particular a centering element. The aligning and/or centering element can be adapted with its outside circumference to an inside contour of the capsule body for the alignment and/or centering of the press element in the capsule. The centering element may comprise an outside circumference that is not closed, wherein individual sections correspond to the inside contour of the capsule body. The centering element may comprise outer circumferential elements, for example, which correspond to the inside contour of the shoulder on the capsule body. The centering element may be designed to be ring-shaped, ellipsoidal or spiral-shaped and may sit on the shoulder of the capsule body, preferably with acting element aligned toward the shoulder. The annular design can be utilized for a predetermined arrangement and/or alignment. The press element may comprise at least one or more webs. The web(s) run(s) in the plane spanned by the centering element. The web(s) may be connected to an acting element, which extends at the height of the chamber and is present in particular in the acting direction between the perforation element and the ram on the device end. The acting element and the web(s) may be designed in one piece with one another. Due to the embodiment with webs, material and weight can be saved in comparison with a solid design. The acting direction runs in the sense of the invention in particular essentially at a right angle to the cover of the capsule and is preferably centered in the capsule.

In a preferred embodiment, the perforation element is formed with a point on both ends, resulting in advantages in handling, in particular in filling the capsule. For example, in this way one can reduce the possibility that material to be added to the lower chamber can reach the perforation element during filling and then can no longer be discharged from the capsule. However, it is also possible to provide that, by means of the perforation element, it is also possible to perforate the divider in addition to perforating the capsule body and/or to perforate the cover. For example, a press element may have a pot-shaped design in the acting direction between the ram on the device end and the perforation element, so that the press element can accommodate the additional perforation tip on action of the ram on the device end, thereby perforating the divider situated between the perforation tip and the press ring.

The invention also creates a method for manufacturing a capsule for producing a liquid food item with a capsule body and two chambers separated from one another by a divider, these chambers being designed for each to receive a substance. The method includes the step of inserting a perforation element into a chamber, filling the chamber with a substance, inserting the divider and connecting the divider to the capsule body. Furthermore, the method includes the step of filling the second chamber situated above the divider and closing the capsule body with the cover, which may be embodied in particular as cover film.

The invention also creates a device for producing a liquid food item, into which a capsule, in particular a capsule such as that described above, can be inserted. The device also includes a ram, which can be moved from a first position outside of the receiving space into a second position, in which the ram protrudes partially into the receiving space.

The invention also creates the use of a capsule as described above for producing a liquid food item, wherein a device as described above in particular can be used.

The invention also creates a system comprising a capsule as described previously and a device as described previously, into which the capsule can be inserted.

Furthermore, the invention creates a system comprised of a device with a perforation element for perforating a capsule that can be inserted into a receiving space of the device, wherein the capsule is perforated in the area of the capsule body and the perforation element can be moved from a first position outside of the receiving space into a second position, in which the perforation element protrudes partially into the receiving space, and a capsule with a capsule body and two chambers for receiving two substances. In this way it is possible for the device itself to have a perforation element so that the perforation element can be used repeatedly for perforating capsule bodies. The perforation element in the device may be embodied as a replacement element, which can be replaced after a predetermined number of cycles and/or perforations. According to this aspect of the invention, to create a device with a perforation element for perforating a capsule that can be inserted into a receiving space of the device, the capsule may also have a chamber. Providing a second chamber, which is formed by means of a divider in the capsule body, is not necessary but is also not ruled out.

In a preferred embodiment, the device of the system has a perforation element, which has a front section that is provided to be in the second position in the capsule. This front section is preferably designed like the preferred embodiment or one of the preferred embodiments of the perforation element described above, which is in the capsule according to the aspect of the invention described previously.

A device for producing a liquid food item from a capsule may comprise an injection element, with which liquid can be introduced into the capsule. Such an injection element may have a perforation tip, with which it can perforate a capsule shell or a cover or a divider. Such an injection element can be shifted from a rear position into a forward position and, in doing so, can perforate the capsule shell and/or the cover and/or the divider. In particular, the injection element preferably has a closed channel for at least a part of its longitudinal extent, with an inlet opening and an outlet opening, so that liquid to be introduced into the capsule can flow through this channel. The outlet opening may be provided in the area of the perforation tip. In a preferred embodiment, the perforation element of the device is not an injection element. In particular, the perforation element of the device preferably does not have a closed channel extending over a portion of its longitudinal extent and in particular preferably does not have a closed channel, which extends over a portion of its longitudinal extent and has an inlet opening and an outlet opening.

The flange and shoulder of the capsule body are preferably connected to one another in one piece, which simplifies production and can make it possible for defined conditions to be maintained. In a particularly preferred specific embodiment, the container of the capsule is designed in one piece, which further simplifies the design and production. For example, the container can be deep drawn or injection molded. One wall of the capsule and/or capsule body may preferably have essentially the same thickness over the entire extent of the wall, wherein the flange of the container may be designed to be slightly thicker.

In one preferred specific embodiment, the flange and the shoulder have essentially the same orientation of their surface normals, so that the filling and placement and/or attachment of the cover and the divider in the subsequent method steps can be carried out by one and the same device, and/or the capsule need not be moved or oriented differently or even moved to different stations for placement and/or attachment of the cover and the divider. The flange and shoulder are especially preferably designed to be concentric with one another. The first and second chamber may be filled through the same opening in the container. This may result in defined conditions for the two chambers. The chamber arranged above the divider may have a bottom with the divider, which may run essentially parallel to the cover.

The capsule body preferably comprises a partially spherical or partially elliptical section with a flattened area having essentially the same orientation as a surface normal of the flange and/or of the shoulder, so that defined conditions for the upper and/or lower chamber may be formed. The capsule body may be designed to have rotational symmetry with regard to a surface normal of the flattened area. The handling can be simplified. A geometric shape is created by means of the flattened area and the partially spherical or partially elliptical section, so that a predetermined condition with regard to insertion into a device for producing liquid food items is allowed. The same orientation of the flattened area relative to the flange and/or the shoulder also allows a standing surface on which the capsule can sit.

In a preferred specific embodiment, the flattened area is set back relative to the partially spherical or partially elliptical section or is shifted forward relative to that section.

In a preferred specific embodiment, the partially spherical or partially elliptical section of the capsule body may be designed to be smooth, where the term "smooth" in the sense of the invention refers to a design that is free of steps, edges and/or corners. The partially spherical and/or partially elliptical section in particular may be rotationally symmetrical to a central axis of the section and/or a central surface normal of the flattened portion, so that easy handling of the capsule body is possible, which is simplified both in filling the capsule body and/or using the capsule in a device for producing liquid food items. A preferred position need not be taken into account.

In a preferred specific embodiment, a peripheral section of the wall, which together with the flange forms an angle of less than 90°, extends between the flange and the shoulder. This enables both stacking of the capsule bodies after production of same and at the same time rapid single feed of the stacked containers. An undercut can be designed with this angle. The containers that have been provided without dividers and covers can also be placed securely one inside the other due to the angle being less than 90°, such that the bottom side of a shoulder of a capsule body rests on the inner edge region of a flange of the capsule body beneath it. This ensures that the capsule bodies do not be arranged in a fixed, form-fitting connection of lateral peripheral edge regions of the capsule bodies, but instead essentially supporting surfaces are designed facing one another, and the capsule bodies sit loosely one on top of the other. By stacking, the shipping volume can be reduced and automation can be achieved, which can be designed to be less complicated because a simplified single feed is possible.

In a preferred specific embodiment, a wall forming an angle of more than 90° with the shoulder, said wall being part of the partially elliptical or partially spherical section or developing into such a section is connected to the shoulder for support of the divider. The effect of an undercut between the flange and the connected section can be reinforced in this way, and a stack that can be converted quickly to single feed is improved.

The peripheral section between the flange and the shoulder especially preferably runs essentially in a straight line, so that a simple geometry with a simplified production of the container is possible. The peripheral section, which need not run in a straight line, may preferably form a rounded angle of less than 90° with the shoulder.

In a preferred specific embodiment, the volume ratio of the top chamber to the bottom chamber is in the range of 1:4 to 1:10, more preferably in the range of 1:5 to 1:9, in particular preferably in the range of 1:6 to 1:8 and most especially preferably in the range of 1:6.5 to 1.75. The upper chamber may preferably be filled with a volume of approx. 10 mL to approx. 25 mL, preferably approx. 15 mL to approx. 20 mL, most especially preferably approx. 18 mL. The lower chamber can be filled with a volume of approx. 30 mL to approx. 50 mL, preferably approx. 35 mL to approx. 45 mL, most especially preferably approx. 40 mL. The chambers, which are designed in different sizes, may be adapted to the requirements for production of the liquid food item and in particular may be only as large as needed. For example, micronutrients, macronutrients, diet foods, high-calorie nutritional supplements and balanceable nutritional supplements may be present in the smaller of the two chambers.

BRIEF DESCRIPTION OF THE DRAWINGS

The invention is explained in more detail in the following, using exemplary embodiments shown in the drawings.

The drawings show.

DETAILED DESCRIPTION

Figure 1:
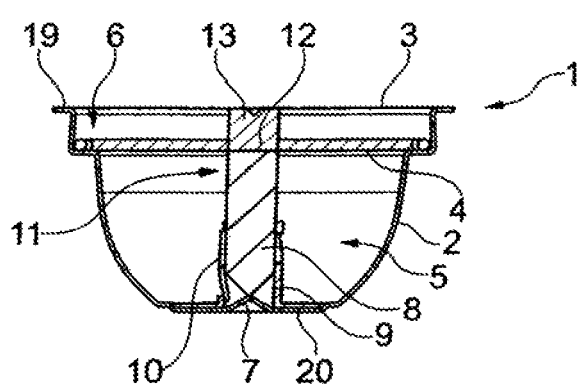
FIG. 1 a capsule according to the invention in a partially sectional diagram as seen from the side.
Figure 2:
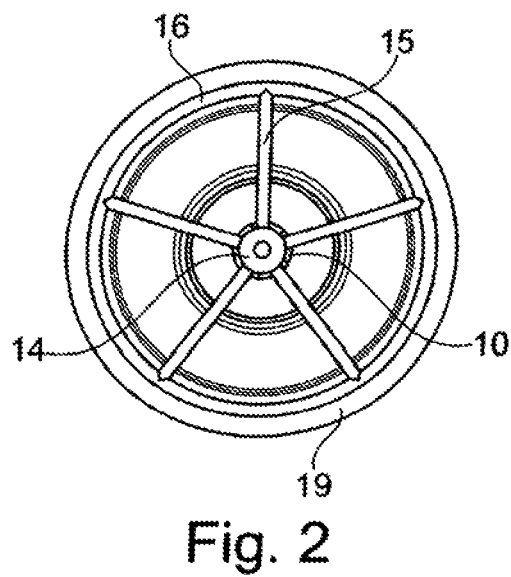
FIG. 2 the capsule according to FIG. 1 in a view from above without the divider and cover.
Figure 3:
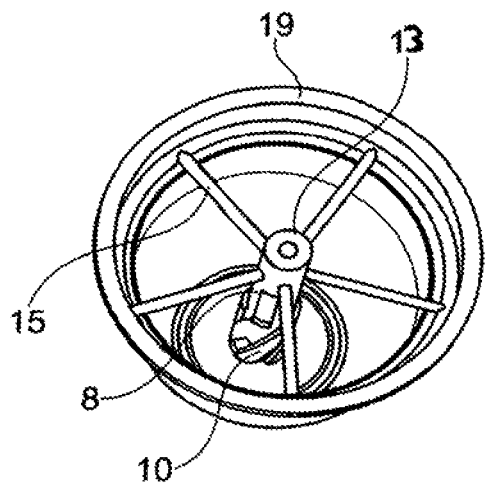
FIG. 3 the capsule according to FIG. 2 in a view obliquely from above.

FIG. 1 shows a capsule 1 in a sectional diagram as seen from the side. The capsule 1 has a capsule body 2, a cover 3 and a divider 4.

The capsule 1 and/or the capsule body 2 is/are closed with the cover 3 at the top. The divider 4 subdivides the interior of the capsule 1 into two areas and/or divides the sealed capsule body 2 into two chambers 5, 6. The divider 4 forms an upper chamber 5 between the cover 3 and the divider 4 and forms a lower chamber 6, which is bordered by the capsule body 2 at the bottom and the side. The capsule 1 is essentially rotationally symmetrical with the central axis.

A substance (not shown) is present in both chambers 5, 6.

A perforation site 7, which can be punctured by means of a perforation element 8, is formed on the bottom of the capsule body 2. The perforation element 8 is designed as an elongated mandrel, which tapers to a point on the front end directed at the perforation site 7. The perforation element 8 has a perforation tip 9 at the front end.

The perforation element 8 sits loosely in the chamber 5 and is surrounded by a guide sleeve 10. The perforation element 8 is directed by the guide sleeve 10 at the perforation site 7 and is guided by means of the guide sleeve 10 with regard to the movement of the perforation element 8.

On the end at a distance from the perforation tip 9, the perforation element 8 has an anvil 11, which is aligned in the acting direction with a ram of a device, into which the capsule 1 can be inserted when the capsule has been inserted into the device. The anvil 11 of the perforation element 8 is freely in contact with the divider 4.

A press element 12, which is aligned in the capsule body 2 on contact by means of its outside contour, which corresponds essentially to the inside contour of the capsule body 2 in the area of the contact, is placed on the divider 4.

The press element 12, which is shown in greater detail in FIGS. 2, 3, 6a and 6b, has a central acting element 13, which is aligned centrally with the perforation element 8. Webs 15, which center the acting element 13 with the capsule body 2 and with the perforation element 8, extend from the acting element 13 to the capsule body 2 for alignment of the acting element 13. The webs 15 are connected at the end at a distance from the acting element 13 by means of a centering ring 16.

Figure 4:
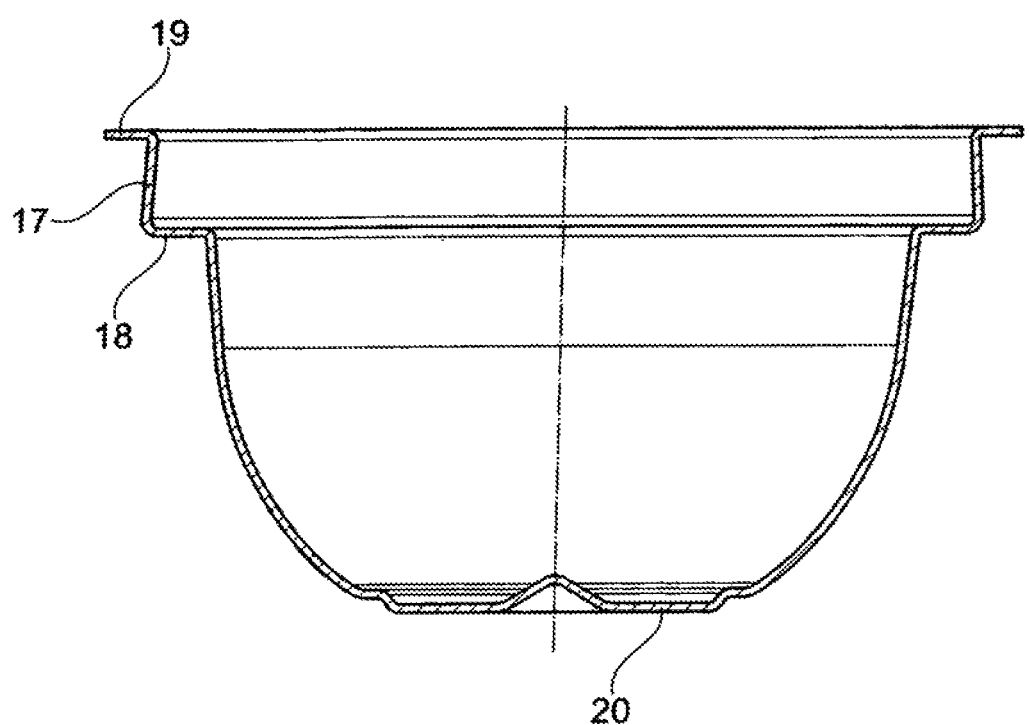
FIG. 4 a capsule body for the capsule according to FIG. 1.

The capsule body, which is illustrated in FIG. 4, is described in greater detail below. The upper chamber 6 is designed with a partially conical shape. The peripheral edge of the upper chamber 6 of the capsule body 2 has a straight-line section 17. A shoulder 18, which forms an angle of less than 90° with the section 17, is connected to the straight line section 17. The shoulder 18 surrounds the opening of the lower chamber 5 at the edge. The divider 4 sits on the edge of the shoulder 18 and is at least partially connected thereto. The wall of the capsule body 2 is designed in the form of a partially elliptical section in the area of the lower chamber 5.

At the head of the capsule body 2, a flange 19 surrounding the opening of the upper chamber 6 and/or the opening of the capsule body 2 at the edge is formed. The cover 3, which is attached at least partially to the flange 19, sits on the flange 19.

The capsule 1 has a flattened area 20 on the bottom at a distance from the cover 3 in the area of the partially elliptical section, formed with rotational symmetry at the center of the capsule body 2. The flattened area 20 is advanced forward with respect to the partially elliptical section.

Figure 5A:
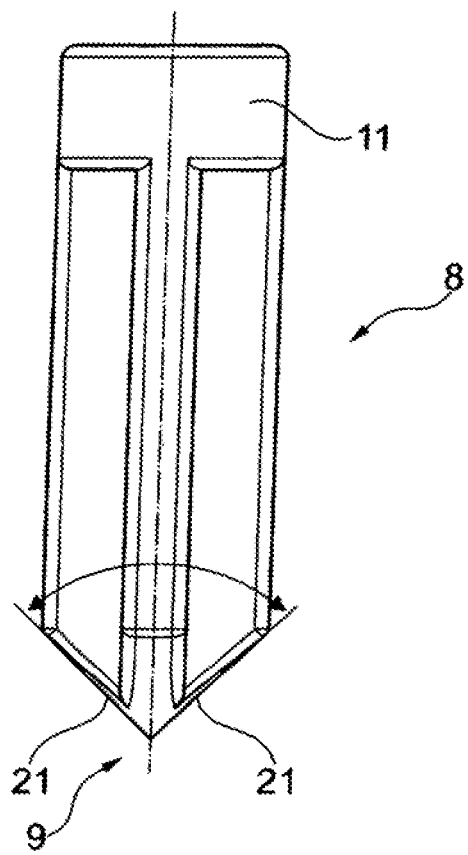
FIG. 5a a view of a perforation element from the side.
Figure 5B:
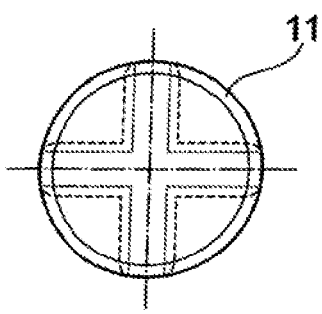
FIG. 5b a view of the perforation element from FIG. 5a in a cross-sectional diagram.
Figure 6A:
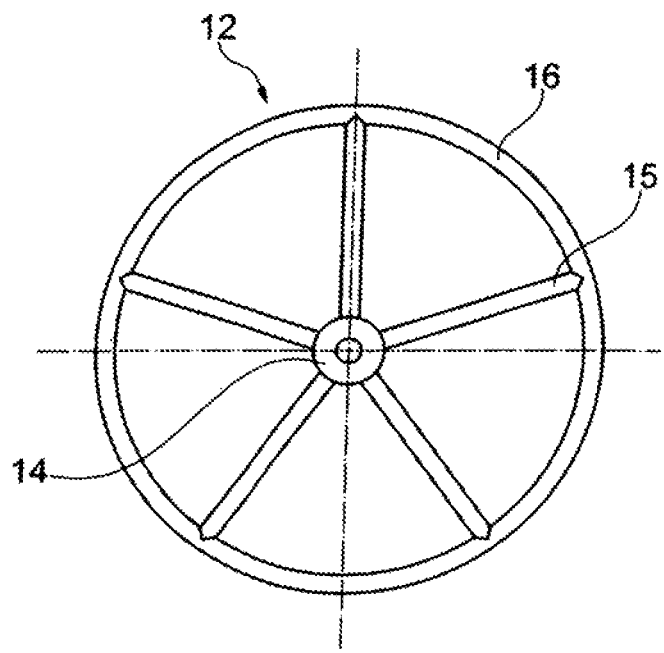
FIG. 6a a view of a press element from above.
Figure 6B:
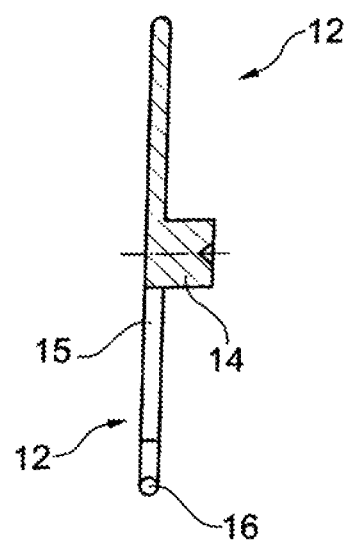
FIG. 6b a view of the press element from FIG. 6a in a partial sectional diagram.

FIGS. 5*a* and 5*b* show an embodiment of a perforation element 8. The perforation element 8 has a perforation tip 9 and an anvil 11. The perforation tip 9 has surfaces 21, which form an angle of 90° to one another. As indicated by FIG. 5*b*, the cross section of the perforation element 8 is designed to be at least partially cruciform. The cruciform shape is retained starting on the anvil 11 up to the perforation tip 9.

Figure 7:
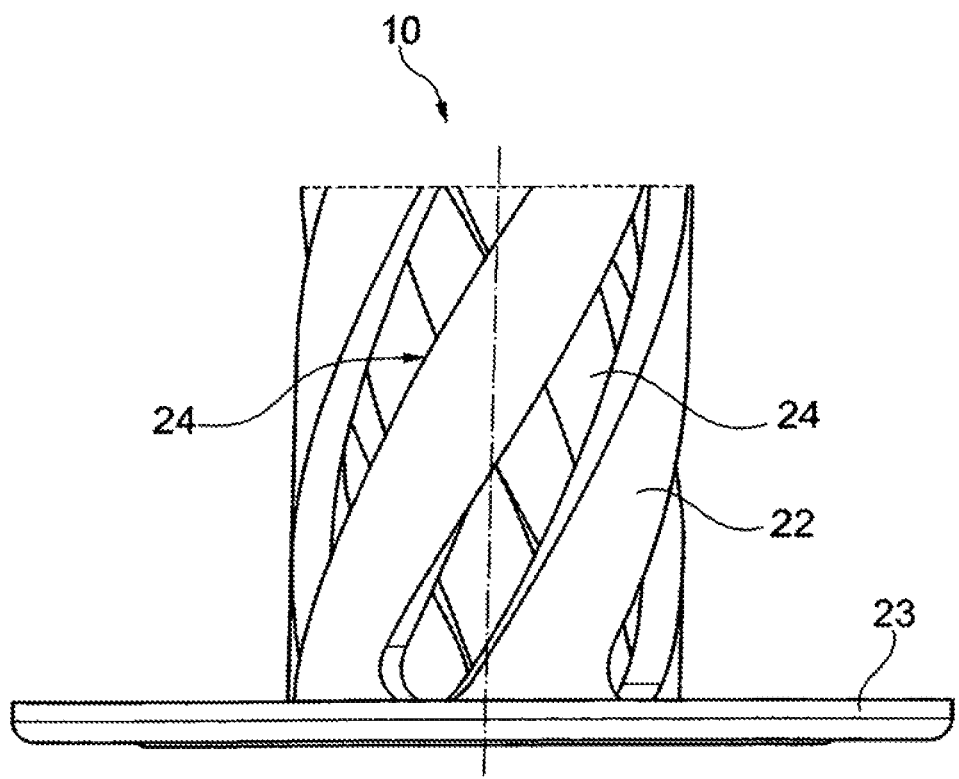
FIG. 7 shows a view of a guide sleeve from the side.

FIG. 7 shows an embodiment of a guide sleeve 10, which has a tubular guide body 22 and a flange-type base area 23. The guide body 22 and the base area 23 form an angle of essentially 90° to one another. Slots 24 are formed in the guide body 22, through which a liquid on the bottom of the chamber 5 can escape into the guide sleeve 22 and through the hole created by means of the perforation element 8 at the perforation site 7. The slots 24 are designed with a curve. Each slot 24 has at least two elliptical and/or circular section directed away from one another. By means of the base body 23, the guide sleeve 10 can be connected to the interior bottom of the capsule body 2.

Figure 8:
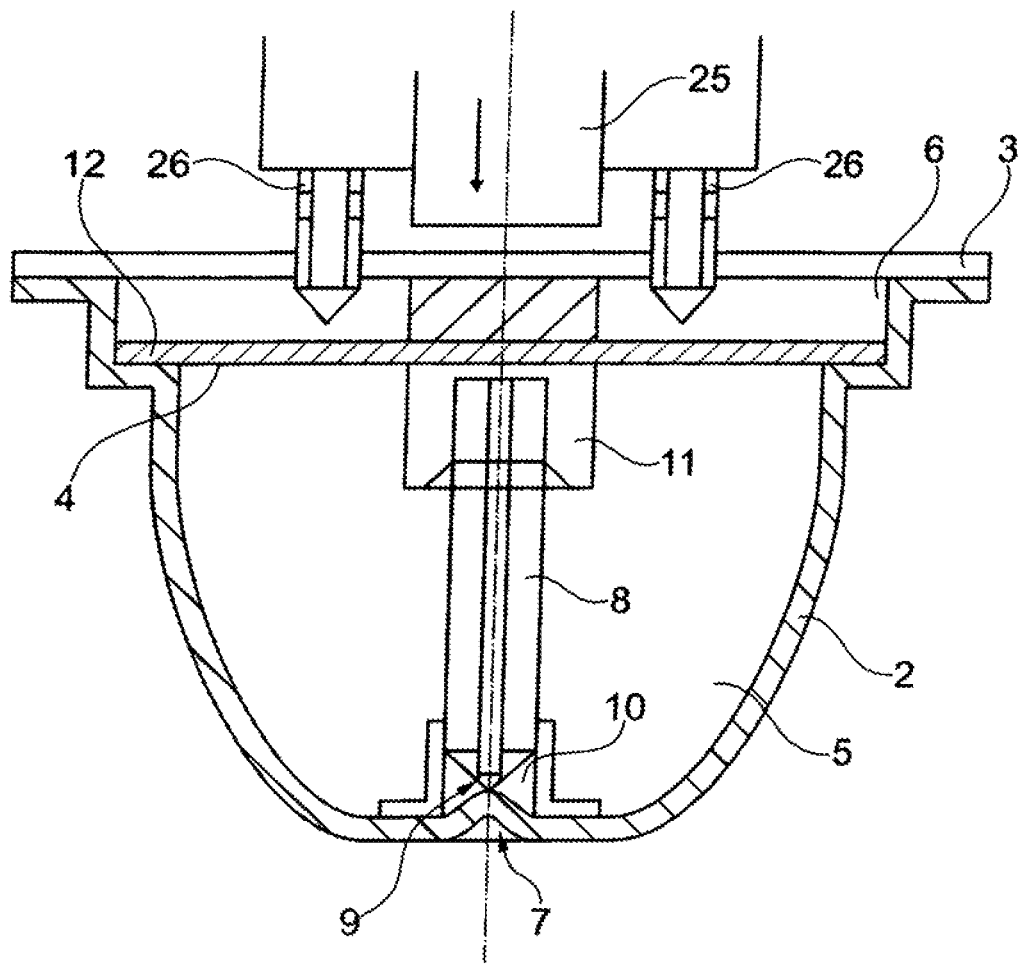
FIG. 8 shows an interaction of a capsule with a device.

FIG. 8 shows schematically an interaction of a capsule 1 with a device, into which the capsule is inserted. The device has a ram 25, which is moved in the direction of the perforation element 8 toward the capsule 1 on the cover end. There may be a force flow from the ram 25 to the press element 12 and the perforation element 8 so that the capsule body 2 is perforated by the perforation element 8 at the perforation site 7. The divider 4 is not perforated between the anvil 11 of the perforation element 8 and the press element 12 because the anvil 11 of the perforation element 8 is designed to be essentially planar. Injection elements 26 that can be acted on by a liquid may be moved toward the capsule 1 in addition to the ram 25—together with it—and can puncture the cover 3 and optionally also the divider 4. Liquid with which the substance in the chambers 5, 6 can be rinsed out of the perforation site 7 can be supplied.

Figure 9:
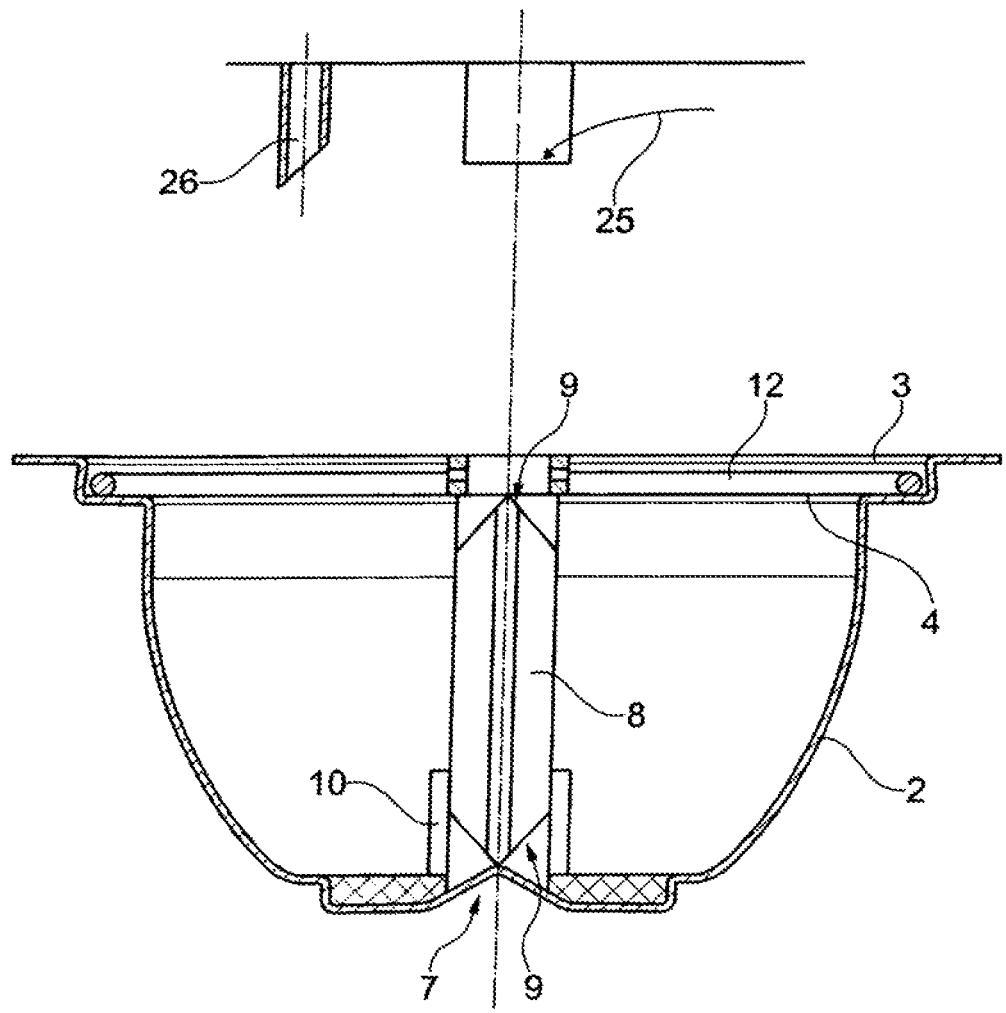
FIG. 9 shows an interaction of a device and a capsule inserted into the device in another embodiment.

FIG. 9 shows an interaction of a device and a capsule 1 inserted into the device, in which the perforation element 8 is designed with a tip on both ends. The perforation element 8 has a perforation tip 9 on each end, which punctures the capsule body 2 at the perforation site 7 and punctures the divider 4 in the area of the acting element 13 of the press element 12. The press element 12 and/or the acting element 13 of the press element 12 therefore has a receptacle, into which the perforation tip 9 at the head can be inserted. The receptacle may also be designed as a liquid channel from the device into the capsule 1.

Figure 10:
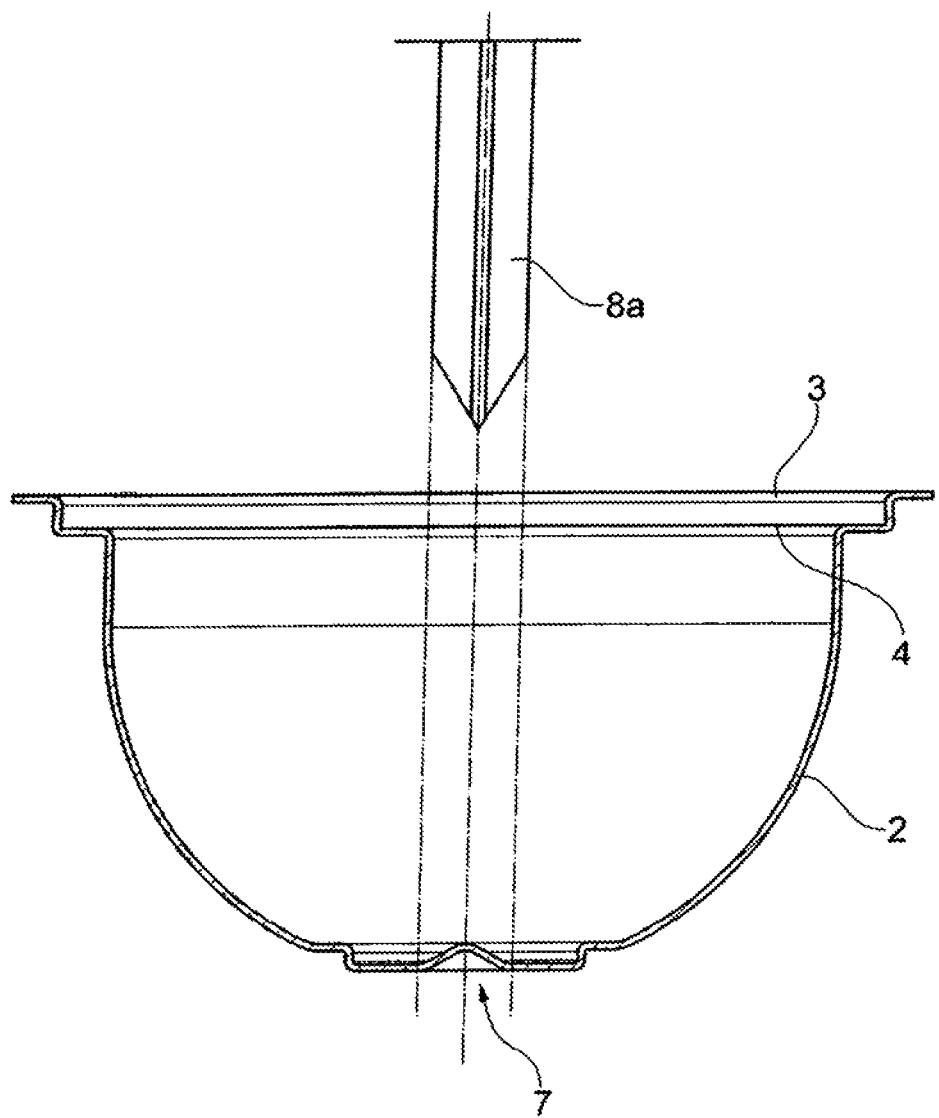
FIG. 10 shows an interaction of a device and a capsule inserted into the device in another embodiment.

FIG. 10 shows an interaction of a device and a capsule 1 inserted into the device, a perforation element 8*a* being formed on the device, so that the capsule body 2, the divider 4 and/or the cover 3 can be perforated. The perforation element 8*a* is designed essentially like the perforation element 8 but may also have a liquid inlet, so that liquid can be carried into the chambers 5, 6 by means of the perforation element 8*a*.

Figure 11:
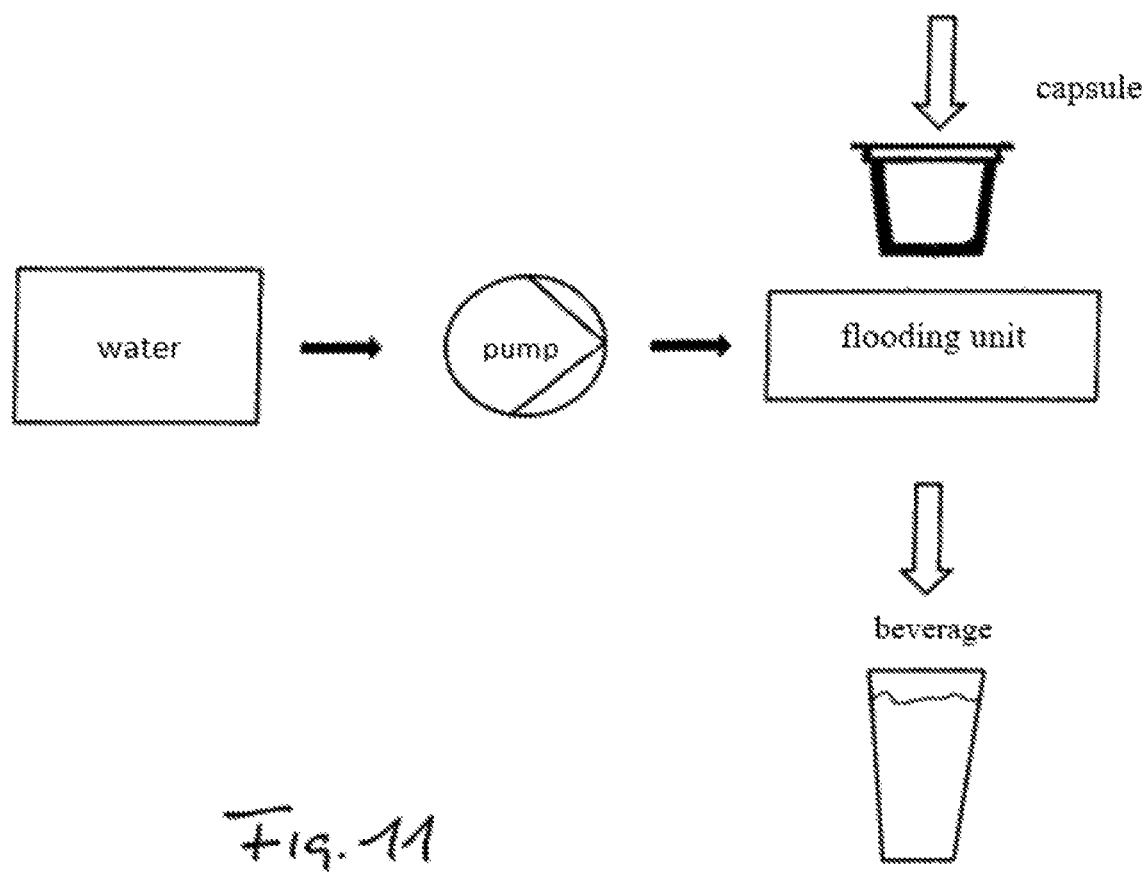
FIG. 11 shows a flow chart for the interaction of a device and a capsule inserted into the device.

FIG. 11 shows a flow chart for an interaction of a capsule in a device, in which water is stored. The device also has a pump, which can act upon the water with pressure. A flooding unit, into which the capsule can be inserted, is formed in the device. The flooding unit may contain the receiving space for the capsule and injection elements, which can inject the water, which is under pressure, into the capsule. The water rinses substances present in the capsule out of it, emerges at an outlet from the device and fills a container situated beneath the outlet with the liquid food item as a beverage.

The invention claimed is:

1. A capsule for producing a liquid food item, having a capsule body and two chambers defined by a fluid-impermeable divider in the capsule for accommodating two substances, wherein one chamber contains a guide sleeve arranged inside the chamber and a perforation element guided by the guide sleeve for perforating the capsule body from within the inside of the one chamber, and an other chamber contains a press element arranged on the divider in the acting direction of the perforation element such that a force applied to the press element flows to the perforation element.

2. The capsule according to claim 1, characterized in that an anvil on the perforation element is in contact with a divider that separates the chambers.

3. The capsule according to claim 1, characterized in that the guide sleeve is connected to the capsule body.

4. The capsule according to claim 1, characterized in that the capsule body has a section in a passage of the guide sleeve, the section being bent (a) into the chamber or (b) out of the chamber.

5. The capsule according to claim 4, characterized in that the guide sleeve has lateral slots.

6. The capsule according to claim 5, characterized in that the perforation element has a longitudinal section, which is designed with a star-shaped cross section.

7. The capsule according to claim 5, characterized in that the press element has an aligning element.

8. The capsule according to claim 7, characterized in that a perforation tip is formed on both ends of the perforation element.

9. The capsule according to claim 8, characterized in that an anvil for the interaction with a ram of a device, into which the capsule can be inserted is arranged on the perforation element.

10. A method for manufacturing a capsule for producing a liquid food item, having a capsule body enclosing two chambers and a fluid-impermeable divider separating the chambers, wherein the following steps are carried out: insertion of a guide sleeve and a perforation element guided by the guide sleeve for perforating the capsule body from within the inside of the one chamber into one of the two chambers, filling the one of the two chambers with a first substance, inserting the divider and attaching the divider to the capsule body, arranging a press element on the divider configured to act in the direction of the perforation element such that a force applied to the press element flows to the perforation element, filling an other of the two chambers situated above the divider with a second substance and closing the capsule body with a cover.

11. A device for producing a liquid food item, into which a capsule, in particular a capsule having a capsule body and two chambers defined by a fluid-impermeable divider in the capsule for accommodating two substances, wherein one chamber contains a guide sleeve arranged inside the chamber and a perforation element guided by the guide sleeve for perforating the capsule body from within the inside of the one chamber, and an other chamber contains a press element arranged on the divider in the acting direction of the perforation element such that a force applied to the press element flows to the perforation element which can be inserted into a receiving space, characterized in that the device has a ram that can be moved from a first position outside of the receiving space into a second position, in which the ram protrudes partially into the receiving space.

12. The capsule according to claim 1, wherein the two chambers comprise an upper chamber and a lower chamber, and wherein the perforation element is arranged within the lower chamber.

13. The capsule according to claim 12, wherein the perforation element is arranged to perforate a bottom of the capsule.

14. The capsule of claim 1, wherein the perforation element is arranged freely within the one chamber that contains the perforation element.

* * * * *